(12) United States Patent
Sutton (10) Patent No.: US 8,413,238 B1
(45) Date of Patent: Apr. 2, 2013

(54) MONITORING DARKNET ACCESS TO IDENTIFY MALICIOUS ACTIVITY

(75) Inventor: Michael Sutton, Reston, VA (US)

(73) Assignee: Zscaler, Inc., San Jose, CA (US)

( * ) Notice: Subject to any disclaimer, the term of this patent is extended or adjusted under 35 U.S.C. 154(b) by 766 days.

(21) Appl. No.: 12/176,912

(22) Filed: Jul. 21, 2008

(51) Int. Cl.
*G06F 11/00* (2006.01)
*G06F 12/14* (2006.01)
*G06F 15/173* (2006.01)

(52) U.S. Cl. .............. 726/23; 726/3; 726/22; 709/223; 709/224

(58) Field of Classification Search .............. 726/3, 13, 726/22, 23, 26; 709/223, 224, 225
See application file for complete search history.

(56) References Cited

U.S. PATENT DOCUMENTS

| | | | | |
|---|---|---|---|---|
| 7,042,852 B2 * | 5/2006 | Hrastar | | 370/310 |
| 7,581,249 B2 * | 8/2009 | Bussiere et al. | | 726/22 |
| 7,657,735 B2 * | 2/2010 | Amoroso et al. | | 713/150 |
| 7,765,596 B2 * | 7/2010 | Longsine et al. | | 726/23 |
| 7,926,104 B1 * | 4/2011 | Sundaram et al. | | 726/22 |
| 8,015,605 B2 * | 9/2011 | Yegneswaran et al. | | 726/22 |
| 8,127,356 B2 * | 2/2012 | Thiele et al. | | 726/23 |
| 8,156,556 B2 * | 4/2012 | Krishnamurthy | | 726/23 |
| 8,181,250 B2 * | 5/2012 | Rafalovich et al. | | 726/23 |
| 2008/0163354 A1 * | 7/2008 | Ben-Shalom et al. | | 726/12 |

OTHER PUBLICATIONS

Bailey, M.; Cooke, E.; Jahanian, F.; Myrick, A.; Sinha, S.;"Practical Darknet Measurement", Information Sciences and Systems, 2006 40th Annual Conference on Publication Year: 2006 , pp. 1496-1501 [retrieved from IEEE database on Mar. 17, 2011].*

E Cooke , M Bailey , F Jahanian , R Mortier, "The dark oracle: perspective-aware unused and unreachable address discovery", Proceedings of the 3rd conference on 3rd Symposium on Networked Systems Design & Implementation, p. 8-8, May 8-10, 2006 [retrieved from Internet "http://www.eecs.umich.edu/~emcooke/pubs/oracle-nsdi06.pdf" on Mar. 17, 2011].*

Inoue, D.; Eto, M.; Yoshioka, K.;Baba, S.;Suzuki, K.;Nakazato, J.;Ohtaka, K.; Nakao, K.;"nicter: An Incident Analysis System Toward Binding Network Monitoring with Malware Analysis"; Information Security Threats Data Collection and Sharing, 2008. WISTDCS '08. WOMBAT Workshop on; Apr. 21-22, 2008; pp. 58-66 [retrieved from IEEE on Mar. 17, 2011].*

N. Vanderavero, X. Brouckaert, O. Bonaventure, B.L. Charlier, "The honeytank: A scalable approach to collect malicious Internet traffic", in: Proc. of IISW04, Dec. 2004. [retrieved from Internet "http://inderscience.metapress.com/media/9h0kwpvtljdhf4uqva6q/contributions/1/6/4/3/1643420t438v2212.pdf" on Mar. 17, 2011].*

Whyte, David; Oorschot, Paul C. van; Kranakis, Evangelos; "Tracking Darkports for Network Defense". Computer Security Applications Conference, 2007. ACSAC 2007. Twenty-Third Annual Dec. 10-14, 2007; pp. 161-171. [retrived from IEEE database on Oct. 24, 2011].*

Ford, M.; Stevens, J.; Ronan, J.; "Initial Results from an IPv6 Darknet13"; Internet Surveillance and Protection, 2006. ICISP '06. International Conference on, Aug. 26-28, 2006; pp. 13-13. [retreived from IEEE database on Feb. 27, 2012].*

* cited by examiner

*Primary Examiner* — Saleh Najjar
*Assistant Examiner* — Lashanya Nash
(74) *Attorney, Agent, or Firm* — Clements Bernard PLLC; Lawrence A. Baratta, Jr.; Christopher L. Bernard (57) ABSTRACT

Systems, methods and apparatus for a distributed security that monitors communications to identify access attempts to/from darknet addresses. Such attempts can be inferred to be associated with malicious activity and a notification or other corrective action can be provided identifying such potentially malicious activity.

15 Claims, 4 Drawing Sheets

MONITORING DARKNET ACCESS TO IDENTIFY MALICIOUS ACTIVITY

BACKGROUND

This disclosure relates to identifying malicious activity.

Malicious code typically attempts to exploit security loopholes on various devices connected to the Internet in an effort to replicate the code, steal information, gather information for an attack, etc. In order to identify vulnerable machines, such malicious code can select a target Internet protocol (IP) address randomly or might scan through one or more ranges of IP addresses.

The malicious code can issue connection requests using various protocols in an attempt to identify the particular services provided by the target IP address. In such situations, the malicious code can identify services provided by a target IP address and attempt to exploit the services using various attack techniques specific to the service and version thereof that the malicious code is attempting to exploit.

Using such algorithms in an attempt to gain access to networks, the malicious code often attempts to access a "darknet." Darknets can be defined as those IP addresses which are either unassigned or unused. Such darknets typically only receive traffic for one of three reasons: accident/mistake, backscatter, and malicious scanning.

Accidental requests typically only result in a small percentage of requests to darknets. Humans generally leverage uniform resource locators (URLs) as opposed to IP addresses when accessing web based resources. Therefore, accidental darknet requests would only occur if a human used and mistyped an IP address or the URL used had an incorrect Domain Name Service (DNS) entry, which pointed to a darknet.

Backscatter generally indicates malicious activity using various spoofing techniques (an attempt to obscure the source of a request). For example, a denial of service attack could be conducted from a randomly spoofed address using Transmission Control Protocol (TCP). When the host at the targeted IP address responds to the initial request in an attempt to perform a three-way handshake, the acknowledgement sent to the host at the spoofed source IP address would be deemed backscatter. However, backscatter would be expected to constitute a small portion of overall traffic, as it is limited to attacks such as a denial of service, which would not require a reliable communication channel to be established. Thus, spoofed source addresses tend to be utilized in attacks leveraging unreliable protocols such as UDP or ICMP, which would not generate backscatter.

Automated scanning, such as used by malicious code, provides the origin of the majority of traffic to darknets. The malicious code responsible for such scanning would commonly randomly select target IP addresses and address ranges for scanning. Such scanning typically does not attempt to avoid accessing darknet addresses.

In an attempt to identify potentially malicious activity, researchers accumulate darknet address ranges and deploy one or more machines assigned darknet addresses to collect information destined for the darknet. However, such solutions are often impractical based upon the expenditure required to obtain and manage large blocks of darknets. Moreover, because IP addresses are a finite resource, efforts have been made to discourage the non-use of large blocks of IP addresses. For example, the American Registry for Internet Numbers (ARIN) has drafted a proposal to require entities with IP address blocks larger than a specified size to have >50% utilization or risk having all or a portion of their block rescinded.

SUMMARY

In general, the subject matter of this application relates to identification of potentially malicious activity based upon access attempts to darknet addresses. One aspect of the subject matter described in this specification can be embodied in a method that includes the actions of identifying a list of darknet addresses; monitoring communications originating from a protected network; comparing destination addresses of the monitored communications originating from the protected network to the list of darknet addresses; and if a match is found between the destination addresses and the list of darknet addresses, providing notification of potential malicious activity originating from the protected network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
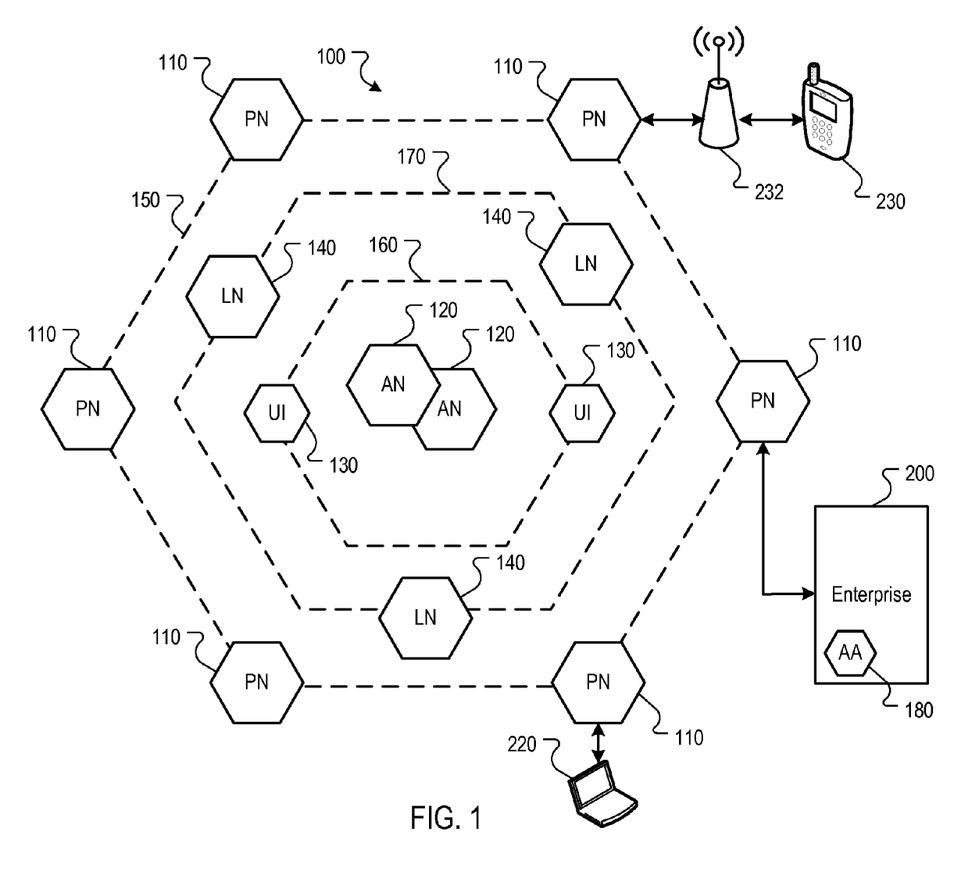
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content by detecting communications destined for a darknet. Example external systems can include an enterprise 200, a computer device 220, and a mobile device 230, or other network and computing systems. A distributed security system such as this ensures that all enterprise traffic (protected network) is available for inspection. Such a solution allows for the identification destined for darknet IP address space and avoids the need to acquire darknet addresses, thereby obviating any danger of violating a regional Internet registry's rules for use of IP address space.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector D=[d1, d2, ..., dn] for a content item of one or more parts C=[c1, c2, ..., cm]. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part C=[c1, c2, ..., cm] of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communicate with the nearest processing node 110 through any available wireless access device, such as an access point, or a cellular gateway. A single computer device 220, such as a consumer's personal computer, may have its browser, e-mail program or any other network capable application configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, known darknet IP address ranges, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 120 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the logging node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or logging node 140 data can be further encrypted, e.g., so that only the enterprise (or user if a single user account) can have access to the logging node 140 data for its account. Other processes of anonymizing, obfuscating, or securing logging node 140 data can also be used.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, within the enterprise an access agent 180 can be configured to perform MPLS labeling.

In another transparent proxy mode example, a protected system, such as the enterprise 200, may identify a processing node 110 as a next hop router for communication with the external servers.

§2.0 Example Detailed System Architecture and Operation

Figure 2:
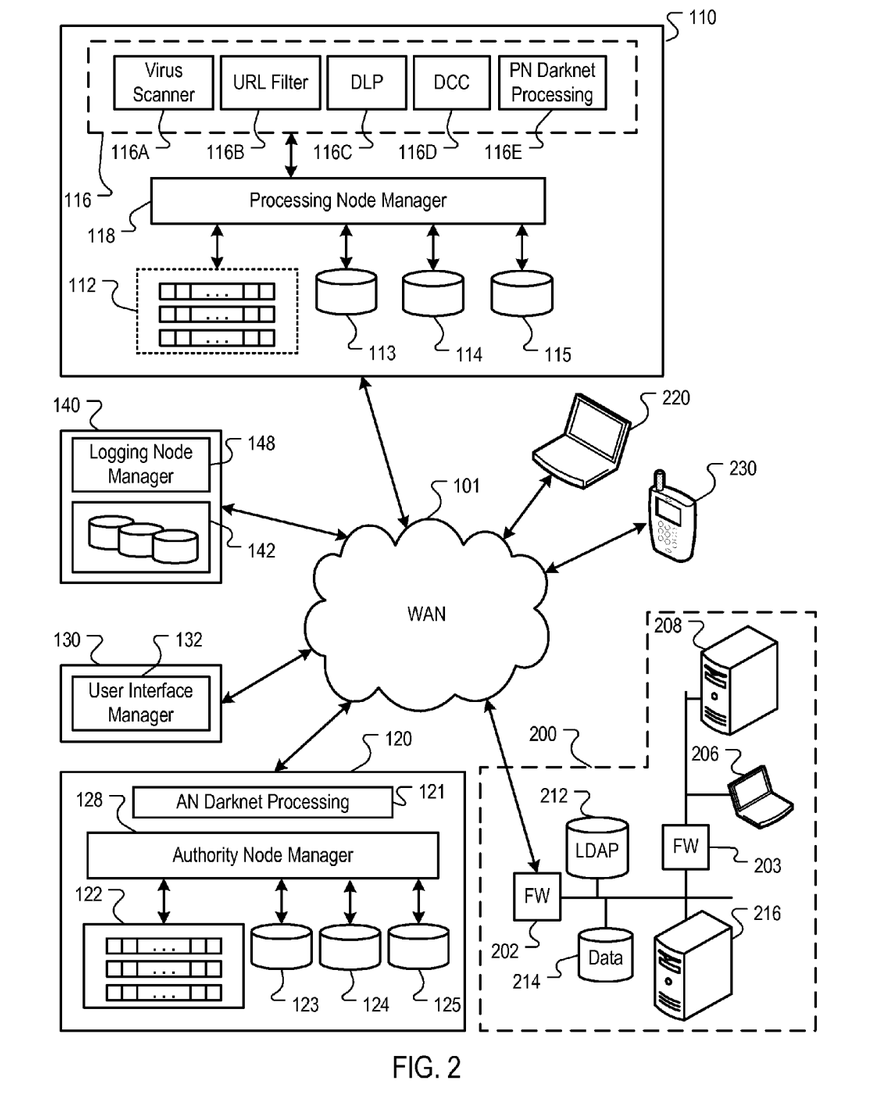
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 216, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the server 216 of the enterprise 200, or to some other secured data provider server.

§2.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system (e.g., system 100 of FIG. 1), can be analyzed to classify the content item according to threat classifications.

The processing node 110 can include data inspection engines 116. Each data inspection engine 116 can be configured to perform a threat detection process to classify content items according to a threat classification for a corresponding threat. For example, the data inspection engines can include a virus scanner engine 116A that can classify a content item as infected or clean, a network URL filter 1168 that can classify a URL address as allowed or restricted, a data leakage protection (DLP) engine 116C that can identify a content item as secure or leaking, and a dynamic content categorization (DCC) engine 116D that can classify a content item as passed or failed. The processing node can also include PN darknet processing 116E operable to identify darknet addresses and store the darknet addresses in a darknet address database 115.

The PN darknet processing 116E can also interrogate communications to determine whether the communication is associated with (e.g., destined to or originating from) an address in the darknet address database 115. The PN darknet processing 116E is described in detail at FIG. 3.

The list of the data inspection engines 116A-116E is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected. For example, a URL request from the enterprise 200 may cause the processing node manager 118 to call only the URL filter engine 116B.

Because the amount of data being processed by the processing nodes 110 can be substantial, the detection processing filter 112 can be used as the first stage of an information lookup procedure. For example, the detection processing filter 112 can be used as a front end to a looking of the threat data 114. Content items can be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence.

Each content item can have an information key that is hashed. For example, the processing node manager 118 may identify the URL address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 can improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 can thus improve performance of queries where the answer to a request for information is usually negative. Such instances can include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information.

§2.2 Example Authority Node Architecture

In general, the authority node 120 includes a data store that stores master security policy data 123 for each of the external systems 200, 220 and 230 and users of those systems. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

In some implementations, the authority node 120 can include AN darknet processing 121. The AN darknet processing 121 can operate to identify darknet address space and store a list of darknet addresses in a darknet address store 125. The AN darknet processing 121 can also operate to distribute the list of darknet addresses to processing node(s) 110. The AN darknet processing 121 is described in more detail with respect to FIG. 3.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and update the master detection processing filter 122. In some implementations, the master detection processing filter 122 can be distributed to the processing nodes 110, which then store a local copy of the detection processing filter 112.

In some implementations, the detection processing filter 122 can be a guard table. The processing node 110 can, for example, use the information in the local detection processing filter 112 to quickly determine the presence and/or absence of information, e.g., whether a particular URL has been checked for malware; whether a particular executable has been virus scanned, whether a destination IP address resides in darknet space, etc.

The authority node 120 can also store master threat data 124. The master threat data 124 can classify content items by threat classifications, e.g., a list of known viruses, a list of known malware sites, spam e-mail domains, darknet IP addresses, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

§2.3 Example Processing Node and Authority Node Communications

The processing node 110 and the authority node 120 can be configured according to one or more push and pull processes to manage content items according to security policy data 113 and/or 123, detection process filters 112 and/or 122, and the threat data 114 and/or 124.

§3.0 Example Compilation of Darknet Addresses

Figure 3:
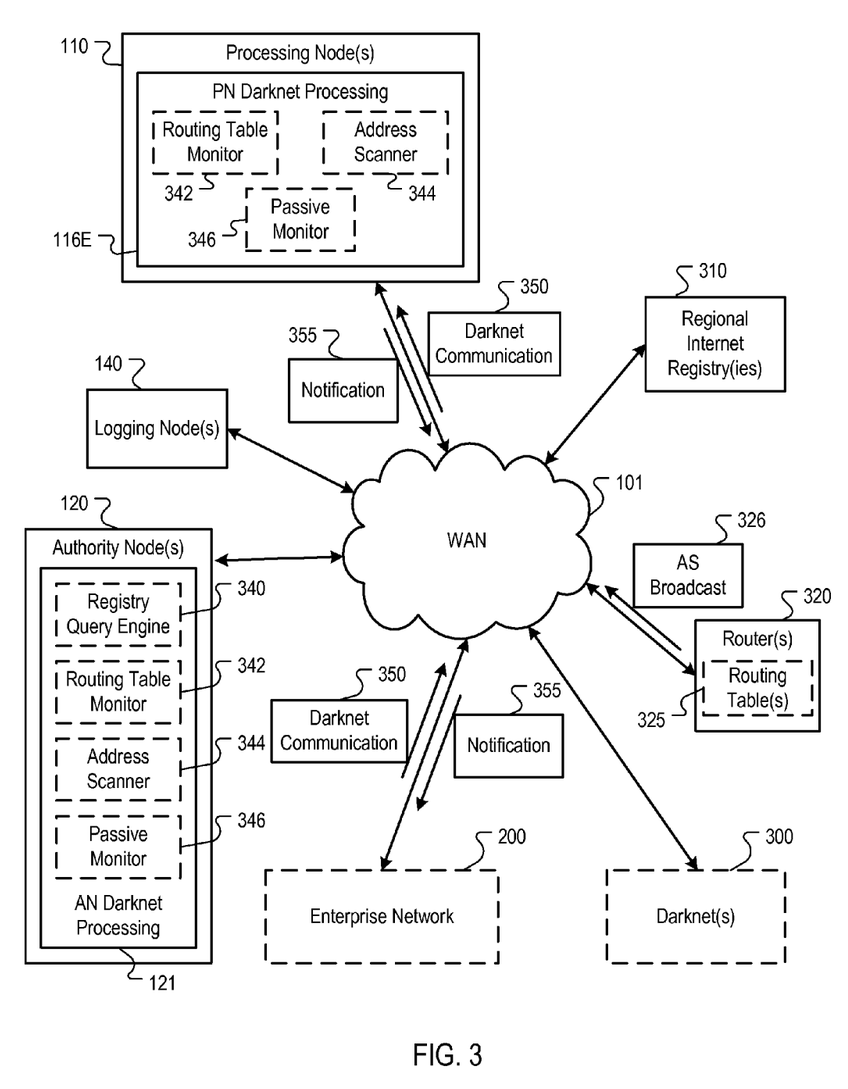
FIG. 3 is a network diagram illustrating operation of a system for monitoring darknet access.

FIG. 3 is a network environment illustrating operation of a system for monitoring darknet access. In various implementations the network environment can include a WAN 101, one or more processing nodes 110, one or more authority nodes 120, one or more logging nodes 140, darknet address space 300, one or more regional Internet registry servers 310 and one or more routers 320. The WAN 101 can be, for example, the Internet. Each of the devices connected to the WAN can originate and receive communications through the WAN using any particular protocol supported by the WAN and/or the originating/receiving device.

In various implementations, the authority node(s) 120 and/or the processing node(s) can operate to identify darknet address space 300. Many methods can be used to identify such darknet address space 300, several examples of which are discussed in detail below.

The darknet address space 300 comprises address space which exists in the addressing schema, but are unused for some reason. In many cases, addresses are unused because the addresses are unassigned by a regional Internet registry 310. The registries can include the American Registry for Internet Numbers (ARIN), Reseaux IP Europeens Network Coordination Centre (RIPE NCC), the Asia-Pacific Network Information Centre (APNIC), the Latin American and Caribbean Internet Address Registry (LACNIC) and the African Network Information Centre (AfriNIC) which are responsible for assigning IP address blocks in various geographic regions. Each regional Internet registry provides a "whois" database, which can be queried to identify unallocated IP address blocks. Unassigned addresses can be assumed to be unused, and therefore part of the darknet address space 300.

§3.1 Querying Regional Internet Registries to Identify Unassigned Addresses

The authority node(s) 120 can compile a list of darknet addresses. In some implementations, the authority node(s) 120 can include a registry query engine 340 operable to query one or more of the registry servers 310 to determine whether a block of numbers is assigned. This registry query engine 340 can periodically repeat this process to identify changes in the darknet address space 300. For example, a company may decide to register a block of IP addresses and start using the newly registered addresses. In such examples, those newly registered addresses would no longer be part of the darknet address space 300 once they were placed in use. In other implementations, the authority node(s) 120 including the registry query engine 340 can download the entire registry and identify the darknet based upon analysis of the registries. The compiled list of darknet addresses can be forwarded to the processing nodes(s) 110 from the authority node(s) 120 based upon the identified darknet address space 300.

In some implementations, when traffic destined for darknet address space is detected, the authority node(s) 120 and/or processing node(s) 110 can include an address scanner 344 used to proactively scan the address space to confirm that the IP addresses in question remain unused prior to issuing a potential malicious activity notification. In such implementations, the proactive scanning of the address space can confirm whether or not the address space remains unused. For example, if a company registers the address space and begins using the addresses after the darknet database had been compiled, it would be improper to notify an administrator that the communications are indicative of malicious activity.

3.2 Monitoring Routing Tables to Identify Unused Addresses

In other implementations, the authority node(s) 120 and/or the processing node(s) 110 can include a routing table monitor 342 operable to monitor routing tables 325 to identify unused nodes. In such implementations, the authority node(s) 120 and/or processing node(s) 110 using routing table monitor(s) 342 can collect autonomous system (AS) broadcast announcements 326 from one or more router(s) 320 to identify a portion of the address space which is unaccounted for in the AS broadcast announcements 326. For example, each routing table monitor 342 can collect addresses that have been included in AS broadcast announcements 326. In other examples, the authority node(s) 120 can collect AS broadcast announcements 326 independently of the processing node(s) 110. The authority node(s) 120 using the routing table monitor(s) 342 can then aggregate the addresses, analyze the aggregated addresses and identify gaps in the address space. Such gaps can be inferred to be either unused or unassigned, and hence part of the darknet address space 300. In some implementations, the identified gaps can be used to modify (e.g., add or delete IP addresses) previously identified darknet address space 300. A list of darknet addresses can be forwarded to the processing nodes(s) 110 from the authority node(s) 120 based upon the identified darknet address space 300.

§3.3 Proactive Scanning of IP Addresses to Identify Unused Addresses

In still further implementations, proactive scanning techniques can be used to identify the darknet address space 300. Proactive scanning techniques can include using address scanner(s) 344, e.g., included in the processing node(s) to attempt connections to target IP addresses. In various implementations, the address scanner(s) 344 can randomly select addresses and/or address ranges from routing tables as target IP address, or the address scanner(s) 344 can select suspicious addresses as the target IP address. Suspicious addresses can include those addresses, which have been identified as having a sudden increase in traffic. Such implementation of proactive scanning techniques can help to reduce false notifications for newly registered addresses. In some implementations, the proactive scanning of address space can be used to modify (e.g., add or delete IP addresses) previously identified darknet address space 300. A list of darknet addresses can be forwarded to the processing nodes(s) 110 from the authority node(s) 120 based upon the identified darknet address space 300.

§3.4 Passive Monitoring to Identify Unused Addresses

In still further implementations, passive monitoring techniques can be used to identify potential darknet address space 300. Passive monitoring techniques can include using processing node(s) 110 and/or authority node(s) 120 including a passive monitor 346 to identify sudden changes in the usage of a range of IP addresses. Such sudden changes in the usage of a range of IP addresses can indicate malicious activity. Given a significant population of end users, passive monitoring can also be used to aid in the identification of assigned but unused address space. Over time, a lack of requests to specific IP addresses and address blocks can suggest the presence of unused or unassigned address space. Passive monitoring can then be paired with active scanning to validate the existence of darknet address space. The active scanning of address space, identified through techniques such as passive scanning, routing table monitors, etc., by the address scanner 344 can be used to modify (e.g., add or delete IP addresses) previously identified darknet address space 300. A list of darknet addresses can be forwarded to the processing nodes(s) 110 from the authority node(s) 120 based upon the identified darknet address space 300.

§3.5 Combinations of Darknet Address Identification Techniques

In some implementations, the registry/registries 310 can be used to build an initial list of darknet addresses included in the darknet address space. Such unassigned nodes are presumptively part of the darknet. Other techniques used to identify assigned but unused addresses (e.g., monitoring routing tables, proactive scanning, passive scanning, etc.) can subsequently be used to identify additional portions of the darknet address space 300. In some implementations, monitoring of the routing tables and/or scanning (passive or active) can be used to remove addresses identified by the regional Internet registry(ies) from the darknet address space 300. For example, the monitoring of routing tables and scanning of IP addresses might occur more frequently than the query(ies) of the regional Internet registry(ies). In such examples, the most current information can be used to identify the darknet address space 300.

In some implementations, the authorization node(s) 120 can compile information about the darknet address space 300, including a list of darknet addresses. The authorization node(s) 120 can then propagate the list of darknet addresses to the processing node(s).

§4.0 Monitoring Communications to Identify Potentially Malicious Activity

Once the list of darknet addresses 115 is received from the authorization node(s) 120, the processing node(s) 110 can begin monitoring communications 350. In some implementations, the processing node(s) 110 can inspect all communications 350 for inclusion of a destination address that is included in the list of darknet addresses. In other implementations, the processing node(s) 110 can inspect only those communications 350 originating from the enterprise network 200 to determine whether those communications 350 are destined for an address on the list of darknet addresses. In further implementations, the origin information of communications 350 can be inspected to identify communications 350 that purport to originate from the darknet address space. Such communications 350 can be presumed to be non-legitimate as the source address has been spoofed (faked). The determination that a destination or origination address is a darknet address can be made by comparing the destination and/or origination address on monitored communications 350 to the list of darknet addresses. If a match is found, the communication 350 is either destined to, or falsely originates from a darknet address.

In those implementations where all communications 350 are inspected, the communications 350 can be processed to identify devices which are likely associated with malicious activity. If such devices reside within the enterprise network, a notification 355 can be provided to the enterprise network (e.g., a network administrator) indicating that such devices are potentially infected with malicious software code. If such devices are outside of the enterprise network, the authority node policy data can be used to implement a rule preventing such devices from communicating with devices within the protected enterprise network.

In those implementations where only those communications 350 originating from devices within a protected enterprise network are inspected, notification 355 can be provided to the enterprise network (e.g., a network administrator) indicating that the device is potentially infected with malicious software code. In some implementations, the processing node(s) 110 can attempt to remove the malicious program code from the device originating communications destined for the darknet address space 300. In other implementations, communications 350 originating from the device can be actively filtered (e.g., through various application specific malware identification programs, such as, performed by processing node manager 118 and data inspection engines 116) based upon identification of the probability that malicious code exists on the device.

In those implementations, where the origination address is monitored, the origination address can be compared to the list of darknet addresses. If a match is found between an origination address and the list of darknet addresses, the communication 350 can be identified as non-legitimate. Such communications 350 can be delayed and/or filtered if the destination address is intended for the protected enterprise network 200. In some implementations, a communication 350 identified as originating from a darknet address can be investigated to determine an actual originating device associated with the communication 350.

In various implementations, upon identification of a non-legitimate communication 350, the address to which the non-legitimate communication is addressed can be proactively scanned before issuing a notification of malicious activity, thereby reducing false positive reports of malicious activity.

Figure 4:
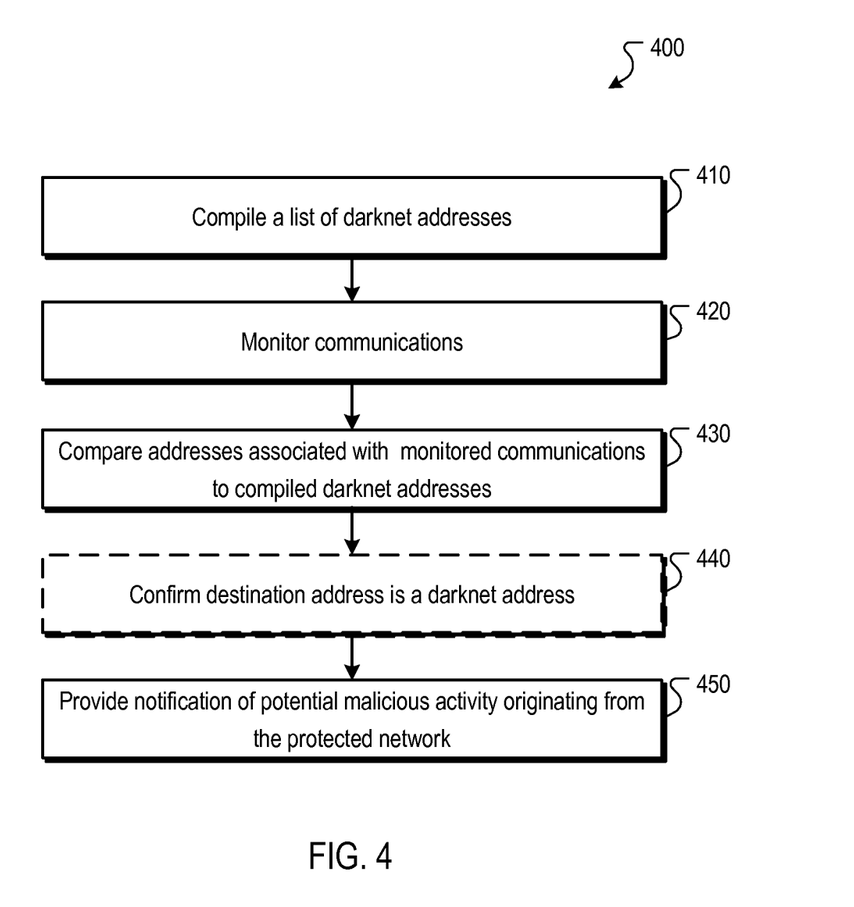
FIG. 4 is a flowchart illustrating an example method for identifying malicious activity based upon darknet access.

FIG. 4 is a flowchart illustrating an example method 400 for identifying malicious activity based upon darknet access. At stage 410, a list of darknet addresses is compiled. The list of darknet addresses can be compiled, for example, by one or more authority nodes (e.g., authority node(s) 120 of FIG. 3) in conjunction with one or more processing nodes (e.g., processing nodes 110 of FIG. 3). Darknet address space can be identified and compiled using a variety of techniques, examples of which are discussed in this document. However, the above described techniques are not intended to limit the application of the monitoring systems and/or methods to any particular darknet compilation technique. In some implementations, the compilation of darknet addresses can query a regional Internet registry to identify whether an address space is assigned. If the address space is not assigned, the address space is considered to be part of a darknet address space and added to the list of darknet addresses.

In additional implementations, the darknet address space can be identified by examining AS broadcast announcements issued by routers. The routers issue such AS broadcast announcements to notify other routers and/or devices that those routers issuing the AS broadcast announcement are responsible for delivering traffic for specified ranges of addresses. Gaps can be identified by aggregating such AS broadcast announcements. Such gaps can be inferred to be unused IP addresses, and therefore labeled as part of the darknet address space and added to the list of darknet addresses.

In further implementations, active scanning of the address space can be used to identify darknet addresses. Active scanning can randomly target IP addresses to determine whether the target IP address is active or inactive. If no response is received, the target IP address can be included as part of the darknet address space and added to the list of darknet addresses. In various implementations, target IP addresses can be identified randomly or can be identified responsive to identification of the address as suspect, for example, by a communication destined for the address, or by another system identifying a communication destined for the address as suspicious.

In still further implementations, passive monitoring can be used to identify address spaces which are unused. Such address space can be inferred to be part of the darknet address space and added to a list of darknet addresses. In some implementations, such passive monitoring can also include scanning the identified addresses to ensure that such address space is unused, instead of merely being associated with very low activity.

In some implementations, a list of darknet addresses can be compiled by the authority node(s) and distributed to one or more processing node(s). In other implementations, each of the processing nodes can compile their own list of darknet addresses. In some such implementations, the processing nodes can share their list of darknet addresses with other processing nodes, and the other processing nodes can resolve any discrepancies in the list of darknet addresses by proactively scanning addresses that differ between lists.

At stage 420, communications are monitored. Communications can be monitored, for example, by one or more processing nodes (e.g., processing nodes 110 of FIG. 3). In some implementations, the processing node(s) can monitor all traffic regardless of source or destination. In other implementations, the processing node(s) can only monitor traffic originating from a protected enterprise network (e.g., enterprise network 200 of FIG. 3). In some implementations, the processing nodes can capture outbound or inbound communications and perform various policy tests on the traffic to ensure that the traffic does not violate policy.

At stage 430, addresses associated with monitored communications can be compared to compiled darknet addresses. The addresses associated with monitored communications can be compared to compiled darknet addresses, for example, by one or more processing nodes (e.g., processing node(s) 110 of FIG. 3). In some implementations, if there is a match between destination addresses and the list of darknet addresses, the communication can be inferred to be indicative of malicious activity.

At optional stage 440, an identified destination address can be confirmed to be a darknet address. The identified destination address can be confirmed to be a darknet address, for example, by a scanner (e.g., scanner 330 of FIG. 3) associated with the processing node (e.g., processing node 110 of FIG. 3) that identified the destination address. In some implementations, the scanner can send a connection request to the identified address. If a device responds to the connection request, the IP address is removed from the list of darknet addresses and the communication is forwarded. If no device responds to the connection request, the communication is identified as indicative of malicious activity.

At stage 450, a notification of potential malicious activity originating from the protected network is provided and/or automated blocking/filtering is implemented. Notification of potential malicious activity can be provided, for example, by one or more processing nodes (e.g., processing node(s) 110 of FIG. 1) and/or an authority node (e.g., authority node 120 of FIG. 2). In some implementations, the notification can be provided to an administrator of a protected enterprise network. In other implementations, the communication can be flagged as potentially malicious. In still further implementations, the notification can be provided to a special purpose application operable to inspect a device for malicious program code and to remove malicious program code from the device, if found. In yet other implementations, the notification can be provided to other processing nodes with instructions to provide filtering or detailed inspection of communications identified as similar (e.g., based upon an origination address). Additionally, traffic may be automatically blocked, redirected or filtered based on predefined rules. Other responses can be provided to such notifications.

The various data exchange and malicious activity identification processes of FIG. 4 are example processes for which the threat data and/or detection process filters can be updated in the system 100 of FIGS. 1 and 2. Other update processes, however, can also be used.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
    identifying with a first server a list of darknet addresses utilizing a plurality of techniques and providing the list of darknet addresses to a second server, wherein the second server is unassociated with any internet protocol addresses on the list of darknet addresses;
    continually monitoring with the second server all communications originating from or destined to a protected network external to a network edge of the protected network, wherein the first server and the second server cooperatively forming a distributed security system external to the protected network, and wherein the list of darknet addresses comprises addresses external to the protected network;
    comparing with the second server destination or source addresses of the monitored communications originating from or destined to the protected network to the list of darknet addresses;
    if a match is found between the destination or source addresses and the list of darknet addresses, providing notification of potential malicious activity originating from or destined to the protected network and blocking the potential malicious activity with the second server such that the potential malicious activity does not enter the protected network or leave the second server;
    updating the list of darknet addresses at the first server or the second server using one or more of the plurality of techniques including proactively scanning addresses and passively monitoring addresses, and distributing updates between the first server and the second server;
    wherein updating a list of darknet addresses comprises:
    compiling a list of active addresses from autonomous systems communications originated by routers;
    identifying potential darknet addresses based upon gaps identified in the list of active addresses;
    attempting to connect to the identified potential darknet addresses; and
    if the attempt to connect to the identified potential darknet addresses is unsuccessful, adding the potential darknet addresses to the list of darknet addresses.

2. The computer-implemented method of claim 1, wherein compiling a list of darknet addresses comprises querying a database associated with a regional Internet registry.

3. The computer-implemented method of claim 1, wherein compiling a list of darknet addresses comprises identifying a sudden increase in traffic destined for a range of internet protocol addresses.

4. The computer-implemented method of claim 3, further comprising:
    attempting to connect to an address within the range of internet protocol addresses; and
    if the attempt to connect to connect to the range of internet protocol addresses is unsuccessful, adding the potential darknet addresses to the list of darknet addresses.

5. The computer-implemented method of claim 1, further comprising if a match is found between the destination addresses and the list of darknet addresses, blocking further communications from a device originating communications with a destination address on the list of darknet addresses and taking appropriate additional steps to control future communications from the device and provide notification of a potential infection.

6. The computer-implemented method of claim 1, further comprising if a match is found between the destination addresses and the list of darknet addresses, removing malicious code from a device associated with the communication including a destination address matching an address from the list of darknet addresses.

7. A non-transitory computer readable media storing software comprising instructions executable by a processing device and upon such execution cause the processing device to perform operations comprising:
    receiving, from a first server over a network, a list of darknet addresses identified utilizing a plurality of techniques, wherein the processing device is unassociated with any internet protocol addresses on the list of darknet addresses;
    continually monitoring all communications originating from or destined to a protected network external to a network edge of the protected network, wherein the first server and the processing device cooperatively forming a distributed security system external to the protected network, and wherein the list of darknet addresses comprises addresses external to the protected network;
    comparing destination addresses of the monitored communications originating from or destined to the protected network to the list of darknet addresses;
    if a match is found between the destination addresses and the list of darknet addresses, providing notification of potential malicious activity originating from the protected network and blocking the potential malicious activity with the processing device such that the potential malicious activity does not enter the protected network or leave the processing device;
    proactively scanning addresses and passively monitoring addresses to provide updates to the list of darknet addresses and providing the updates to the first server;
    wherein updating a list of darknet addresses comprises:
    compiling a list of active addresses from autonomous systems communications originated by routers;
    identifying potential darknet addresses based upon gaps identified in the list of active addresses;
    attempting to connect to the identified potential darknet addresses; and
    if the attempt to connect to connect to the identified potential darknet addresses is unsuccessful, adding the potential darknet addresses to the list of darknet addresses.

8. The software of claim 7, wherein compiling a list of darknet addresses comprises querying a database associated with a regional Internet registry.

9. The software of claim 7, wherein compiling a list of darknet addresses comprises identifying a sudden increase in traffic destined for a range of internet protocol addresses.

10. The software of claim 9, wherein the instructions are further operable to cause the processing system to perform an operation comprising:
    attempting to connect to an address within the range of internet protocol addresses; and
    if the attempt to connect to connect to the range of internet protocol addresses is unsuccessful, adding the potential darknet addresses to the list of darknet addresses.

11. The software of claim 7, wherein the instructions are further operable to cause the processing system to perform an operation comprising:
  if a match is found between the destination addresses and the list of darknet addresses, refusing further communications from a device originating communications with a destination address on the list of darknet addresses.

12. The software of claim 7, wherein the instructions are further operable to cause the processing system to perform an operation comprising:
  if a match is found between the destination addresses and the list of darknet addresses, removing malicious code from a device associated with the communication including a destination address matching an address from the list of darknet addresses.

13. A distributed security system, comprising:
  an authority node device comprising a darknet address list generator configured to generate and maintain a list of darknet addresses using a plurality of techniques;
  one or more processing node devices communicatively coupled to the authority node using a network, wherein the authority node device and the one or more processing node devices cooperatively form the distributed security system, wherein the one or more processing node devices are unassociated with any internet protocol addresses on the list of darknet addresses and each of the one or more processing node devices configured to:
    receive the list of darknet address from the authority node device;
    establish communications with a plurality of users;
    monitor all of the communications of the plurality of users with devices external to the one or more processing node devices and a protected network protected by the distributed security system, wherein the distributed security system is external to the protected network, and wherein the list of darknet addresses comprises addresses external to the protected network;
    detect addresses in the communications as being part of the list of darknet addresses;
  prevent malicious activity based on the detected addresses, wherein the malicious activity is prevented by blocking at the one or more processing node devices without the malicious activity entering the network protected by the distributed security system;
  proactively scan and passively monitor addresses to determine updates to the list of darknet addresses; and
  communicate the updates to the authority node device and receive additional updates to the list of darknet addresses from the authority node device; and
  wherein each of the one or more processing node devices comprises a darknet processor configured to identify darknet addresses for the list of darknet addresses using a local routing table monitor configured to monitor routing tables to identify unused nodes, a local address scanner configured to randomly select addresses or select suspicious addresses to attempt communication therewith, and a local passive monitor configured to detect sudden changes in a range of addresses.

14. The distributed security system of claim 13, wherein the authority node device comprises:
  a registry query engine configured to query an address database;
  a routing table monitor configured to monitor routing tables to identify unused nodes;
  an address scanner configured to randomly select addresses or select suspicious addresses to attempt communication therewith; and
  a passive monitor configured to detect sudden changes in a range of addresses;
  wherein the authority node device utilizes each of the registry query engine, the routing table monitor, the address scanner and the passive monitor to create and maintain the list of darknet addresses.

15. The distributed security system of claim 13, wherein each of the one or more processing node device comprises:
  a virus scanner configured to monitor the communications of the plurality of users to classify content as infected or clean;
  a uniform resource locator (URL) filter to monitor the communications of the plurality of users to classify URL addresses as allowed or restricted; and
  a data leakage protection engine to monitor the communications of the plurality of users to identify leaking content;

* * * * *